United States Patent
Sebastian et al.

(10) Patent No.: US 6,572,838 B1
(45) Date of Patent: Jun. 3, 2003

(54) PROCESS FOR THE PREPARATION OF MOLECULAR SIEVE ADSORBENT FOR SELECTIVE ADSORPTION OF NITROGEN AND ARGON

(75) Inventors: Jince Sebastian, Gujarat (IN); Raksh Vir Jasra, Gujarat (IN)

(73) Assignee: Council of Scientific and Industrial Research, New Delhi (IN)

(*) Notice: Subject to any disclaimer, the term of this patent is extended or adjusted under 35 U.S.C. 154(b) by 0 days.

(21) Appl. No.: 10/105,876

(22) Filed: Mar. 25, 2002

(51) Int. Cl.⁷ .............................................. C01B 39/14
(52) U.S. Cl. ............... 423/700; 423/713; 423/DIG. 24; 502/85; 95/902
(58) Field of Search ................................. 423/700, 713, 423/DIG. 24; 502/85; 95/902

(56) References Cited

U.S. PATENT DOCUMENTS

| | | |
|---|---|---|
| 3,973,931 A | 8/1976 | Collins et al. |
| 4,481,018 A | 11/1984 | Coe et al. |
| 4,557,736 A | 12/1985 | Sircar et al. |
| 4,756,723 A | 7/1988 | Sircar |
| 4,859,217 A | 8/1989 | Chao |
| 4,892,567 A * | 1/1990 | Yan .............................. 95/126 |
| 4,943,304 A | 7/1990 | Coe et al. |
| 4,964,889 A | 10/1990 | Chao |
| 5,114,440 A | 5/1992 | Reiss |
| 5,152,813 A | 10/1992 | Coe et al. |
| 5,174,979 A | 12/1992 | Chao et al. |
| 5,206,195 A * | 4/1993 | Ando et al. .................... 502/64 |
| 5,266,102 A | 11/1993 | Gafney et al. |
| 5,443,812 A * | 8/1995 | Nakajima et al. ....... 156/345.48 |
| 5,454,857 A | 10/1995 | Chao |
| 5,464,467 A | 11/1995 | Fitch et al. |
| 5,470,378 A * | 11/1995 | Kandybin et al. ............. 95/100 |
| 5,698,013 A | 12/1997 | Chao |
| 5,779,767 A | 7/1998 | Golden et al. |
| 5,868,818 A | 2/1999 | Ogawa et al. |
| 5,945,079 A | 8/1999 | Mullhaupt et al. |
| 6,030,916 A | 2/2000 | Choudary et al. |
| 6,087,289 A | 7/2000 | Choudary et al. |
| 6,143,057 A | 11/2000 | Bulow et al. |
| 6,231,644 B1 | 5/2001 | Jain et al. |

OTHER PUBLICATIONS

"Background and Prior Art References" Section of the Present Application.

* cited by examiner

Primary Examiner—David Sample
(74) Attorney, Agent, or Firm—Dority & Manning, P.A.

(57) ABSTRACT

The present invention relates to the manufacture of novel molecular sieve adsorbents for the separation of a gaseous mixture of oxygen, nitrogen and argon. The adsorbent is useful for the separation of oxygen and/or nitrogen from air. More specifically, the invention relates to the manufacture of a molecular sieve adsorbent, which is selective towards nitrogen from its gaseous mixture with oxygen and/or argon and argon from its gaseous mixture with oxygen.

18 Claims, 4 Drawing Sheets

NITROGEN ADSORPTION ISOTHERMS AT 30°C

PROCESS FOR THE PREPARATION OF MOLECULAR SIEVE ADSORBENT FOR SELECTIVE ADSORPTION OF NITROGEN AND ARGON

FIELD OF INVENTION

The present invention relates to a process for the preparation of a molecular sieve adsorbent for selectively adsorbing nitrogen and argon from a gaseous mixture with oxygen.

BACKGROUND AND PRIOR ART REFERENCES

Adsorption processes for the separation of oxygen and nitrogen from air are being increasingly used for commercial purposes for the last three decades. Oxygen requirements in sewage treatment, fermentation, cutting and welding, fish breeding, electric furnaces, pulp bleaching, glass blowing, medical purposes and in the steel industries particularly when the required oxygen purity is 90 to 95% is being largely met by adsorption based pressure swing or vacuum swing processes. It is estimated that at present, 4–5% of the world's oxygen demand is met by adsorptive separation of air. However, the maximum attainable purity by adsorption processes is around 95% with separation of 0.934 mole percent argon present in the air being a limiting factor to achieve 100% oxygen purity. Furthermore, the adsorption-based production of oxygen from air is economically not competitive to cryogenic fractionation of air for production levels more than 100 tonne oxygen per day. Of the total cost of the oxygen production by adsorption processes, it is estimated that capital cost of equipment and power consumption are the two major factors influencing the overall cost with their share being 50% and 40% respectively. Along with the factors like process and system design, the adsorbent is the key component, which can bring down the cost of oxygen production by adsorption. The adsorbent selectivity and capacity are important parameters for determining the size of the adsorption vessels, compressors or vacuum pumps. It is desirable to have an adsorbent, which shows a high adsorption capacity as well as selectivity for nitrogen compared to oxygen. The improvement in these properties of the adsorbent directly results in lowering the adsorbent inventory of a system and hence the size and power consumption of the air compressor or vacuum pump. Furthermore, adsorbent having a high. nitrogen capacity and selectivity can also be used to produce reasonably pure nitrogen along with oxygen by evacuating nitrogen adsorbed on the adsorbent. Furthermore, adsorbents having both nitrogen and argon selectivity over oxygen can be used for producing high purity (>96%) oxygen from air.

It is, therefore, highly desirable, for an adsorbent to have good adsorption capacity and adsorption selectivity for a particular component sought to be separated.

Adsorption capacity of the adsorbent is defined as the amount in terms of volume or weight of the desired component adsorbed per unit volume or weight of the adsorbent. The higher the adsorbent's capacity for the desired components the better is the adsorbent as the increased adsorption capacity of a particular adsorbent helps to reduce the amount of adsorbent required to separate a specific amount of a component from a mixture of particular concentration. Such a reduction in adsorbent quantity in a specific adsorption process brings down the cost of a separation process.

The adsorption selectivity of a component results from steric factors such as the differences in the size and shape of the adsorbate molecules; equilibrium effect, i.e. when the adsorption isotherms of components of a gas mixture differ appreciably; kinetic effect, when the components have substantially different adsorption rates.

It is generally observed that for a process to be commercially economical, the minimum acceptable adsorption selectivity for the desired component is about 3 and when the adsorption selectivity is less than 2, it is difficult to design an efficient adsorption process.

In the prior art, adsorbent which are selective for nitrogen from its mixture with oxygen and argon have been reported wherein the zeolites of type A, X and mordenite have been used after ion exchanging alkali and/or alkaline earth metal ions. However, the adsorption selectivity reported for the commercially used zeolite A based adsorbents for this purpose varies from 3 to 5 and adsorption capacity from 12–15 cc/g at 765 mmHg and 30° C. The efforts to enhance the adsorption capacity and selectivity have been reported by increasing the number of exchangeable cations into the zeolite structure by modifying the chemical composition of the zeolite. The adsorption selectivity for nitrogen has also been substantially enhanced by exchanging the zeolite with cations like lithium and/or calcium in some zeolite types.

Zeolite A having a specific amount of calcium has been commercially used for oxygen production from air by selectively adsorbing nitrogen. However, presently used adsorbent has the following limitations:

Low adsorption capacity compared to other commercially used adsorbents.

Low adsorption selectivity.

It gives oxygen with only 95% maximum purity.

Sensitivity to moisture.

It needs multiple exchange with calcium salt.

The activation of the adsorbent requires much care, in order to prevent the hydroxylation.

R. V. Jasra et al. reviewed the recent status of pressure swing adsorption as a process for separating multi component gas mixture in "Separation of gases by pressure swing adsorption"; Separation Science and Technology, 26(7), pp. 885–930, 1991, The application of a new generation of adsorbents were described in detail. In "Adsorption of a Nitrogen-Oxygen mixture in NaCaA zeolites by elution Chromatography", Ind. Eng. Chem. Res. 1993, 32, 548–552, N. V. Choudary et al. describes the influence of calcium content on adsorption of nitrogen and oxygen is studied on various NaCaA zeolite samples. N. V. Choudary et al. describes the adsorption and desorption of nitrogen, oxygen and argon in mordenite type zeolite having different Si/Al ratios in 'Sorption of nitrogen, oxygen and argon in mordenite type zeolites', Indian Journal of Chemistry Vol. 38A January 1999, pp.34–39. The heat of adsorption of nitrogen and argon in mordenite, NaA and NaX were compared to revels the sorbate interactions with extra-frame work sodium ions as well as lattice oxygen atoms.

Reference may be made to J. J. Collins et al in U.S. Pat. No. 3,973,931(1976) entitled "Air separation by adsorption", wherein an adiabatic pressure swing process for air separation by selective adsorption in atleast two zeolitic molecular sieve beds in which air is introduced at below 90° F., the coldest gas temperature in the inlet end is 35° F., delta T atleast 15° F., the inlet end is heated to maintain the gas at maximum of at least 20° F. warner than without heating, but below 175° F. The main drawback is it require heating and temperature control in the air separation process.

C. G. Coe et al. in U.S. Pat. No. 4,481,018 (1984) entitled "Polyvalent ion exchanged adsorbent for air separation", describes the use of a thermally activated polyvalent ion exchanged faujasite-containing compositions with selectivity 3.4 to 6.7 at 30° C. for the separation of air into oxygen and nitrogen. The drawbacks are the thermal activation process requires very slow heating to prevent hydroxylation and the selectivity of the adsorbent is only 3.4 to 6.7 at 30° C.

S. Sircar et al in U.S. Pat. No. 4,557,736 (1985) entitled "Binary ion exchanged type X zeolite adsorbent", describes the use of an adsorbent comprises a binary ion exchanged type X zeolite, in which 5%–40% of the available ion sites are occupied by calcium and 60%–95% of the available ion sites are occupied by strontium is used for the adsorption of nitrogen from an air stream at superambient pressure to produce an oxygen rich product streem. The main drawback is the preparation of the adsorbent requires multistage cation exchange process.

S. Sircar in U.S. Pat. No. 4,756,723 (1988) entitled "Preparation of high purity oxygen", describes the use of a single stage pressure swing adsorption method for the production of approximately 95% pure oxygen. The main drawback is the maximum attainable oxygen purity is only 95%.

C. C. Chao in U.S. Pat. No. 4,859,217 entitled (1989) "Process for separating nitrogen from mixtures, thereof with less polar substances", wherein highly lithium exchanged low silica form of zeolite X containing more than ninety percent lithium cations are used for the selective adsorption of nitrogen from less polar gases. These adsorbents were prepared by lithium exchanging with 4–12 fold excess $LiCl_3$ solution. The main drawbacks are the adsorbents are highly moisture sensitive and the lithium exchange requires 4–12 fold excess $LiCl_3$ solution.

C. G. Coe et al. in U.S. Pat. No. 4,943,304 (1990) entitled "Process for the purification of bulk gases by using chabazite adsorbents", which provides a process for the selective adsorption of one or more minor constituents from a bulk gas stream using a chabazite. The main drawback is the known methods for preparing commercially useful synthetic chabazites are not practical since they suffer from low yields, poor product purity, long crystallization times and are difficult if not impractical to scale up.

C. C. Chao in U.S. Pat. No. 4,964,889 (1990) entitled "Selective adsorption on magnesium containing clinoptilites", in which gases having molecular dimensions equal to or smaller than nitrogen are selectively adsorbed and separated from other gases having molecular dimensions higher than nitrogen. The main drawback is the particle size of the commercial clinoptilolite varies and the particle size of the clinoptilolite will affect the speed and completeness of the ion exchange reaction.

G. Reiss in U.S. Pat. No. 5,114,440 (1992) entitled "Process for the adsorptive-oxygen enrichment of air with mixture of calcium zeolite A molecular sieve by means of vacuum swing adsorption", which gives a process for oxygen enrichment of air by means of vacuum swing adsorption using CaA molecular sieve. The drawbacks of this adsorbent are low nitrogen adsorption capacity, low selectivity of nitrogen over oxygen, its preparation needs multistage calcium exchange and its activation process requires very slow heating to prevent hydroxylation.

C. G. Coe et al in U.S. Pat. No. 5,152,813 (1992) entitled "Nitrogen adsorption with a Ca and/or Sr exchanged lithium X zeolite", which is directed to a process for separating nitrogen from gas mixtures containing oxygen, hydrogen, argon or helium by use of an at least binary exchanged X-zeolite having lithium and calcium and/or strontium ions in ratio of preferably 5% to 50% calcium and/or strontium and 50% to 95% lithium. The main drawbacks are the preparation of the adsorbent requires multistage cation exchange, its activation process requires very slow heating to prevent hydroxylation and adsorbent is highly sensitive to moisture.

C. C. Chao et al.in U.S. Pat. No. 5,174,979 (1992) entitled "Mixed ion exchanged zeolites and processes for the use thereof in gas separations", wherein lithium/alkaline earth metal X zeolites in which the lithium:alkaline earth metal equivalent ratio is from 95:5 to about 50:50 and lithium/alkaline earth metal A zeolites in which the lithium: alkaline earth metal equivalent ratio is from 10:90 to about 70:30 are found useful for the separation of oxygen and nitrogen from a gas mixture. The main drawbacks are the preparation of the adsorbent requires multistage cation exchange, nitrogen selectivity is only 2–7 and the adsorbent is highly moisture sensitive.

T. R. Gafney et al. in U.S. Pat. No. 5,266,102 (1993) entitled "Oxygen VSA process with low oxygen capacity adsorbents", wherein adsorbents with moderate nitrogen capacity and a high selectivity is used for the separation by VSA process. The main drawbacks are the maximum attainable oxygen purity is only 95% and adsorbent with low nitrogen capacity was used for the separation process.

C. C. Chao in U.S. Pat. No. 5,454,857 (1995) entitled "Air separation process", wherein 60 to 89 equivalent percent calcium exchanged forms of zeolite X having silica/alumina ratio in the range of 2.0 to 2.4 is used in a temperature range of 50° C. to −20° C. and pressure range of 0.05 to 5 atmospheres. The main drawbacks are the preparation of the adsorbent requires multistage cation exchange and its activation process requirs very slow heating to prevent hydroxylation.

F. R. Fitch et al in U.S. Pat. No. 5,464,467 (995) entitled "Adsorptive separation of nitrogen from other gases", where in type X zeolites whose charge compensating cations are composed of 95 to 50% lithium ions, 4 to 50% of one or more of aluminum, cerium, lanthanum and mixed lanthanides and 0 to 15% of other ions were used for selectively adsorb nitrogen from gas mixture. The main drawbacks of this adsorbent are its high affinity towards moisture and its preparation requires multistage cation exchange from 5 to 10 fold lithium chloride solutions.

C. C. Chao et al. in U.S. Pat. No. 5,698,013 (1997) entitled "Nitrogen selective zeolitic adsorbent for use in air separation process", wherein using 60 to 89 equivalent percent calcium exchanged forms of zeolite X having $SiO_2$/$Al_2O_3$ ratio with in the range of 2.0 to 2.4, as selective adsorption for nitrogen in air separation process by pressure swing adsorption. The main drawbacks of this adsorbent are its high affinity towards moisture and its preparation requires multistage calcium exchange and its activation process requirs very slow heating to prevent hydroxylation.

T. C. Golden et al. in U.S. Pat. No. 5,779,767 (1998) entitled "Use of zeolites and alumna in adsorption processes", wherein describes a process for the purification of air by adsorption. The main drawback is this adsorbent is useful only for the adsorption of carbon dioxide, water, hydrocarbons and nitrogen oxides from the gas mixtures.

N. Ogawa et al. in U.S. Pat. No. 5,868,818 (1999) entitled "Adsorbents for air separation, production method thereof, and air-separation method using it", describes the use of crystalline zeolite X having an $SiO_2$/$Al_2O_3$ molar ratio of not larger than 3.0, which contains at least 90 mol% lithium cations were used for the air separation by pressure swing adsorption. The main drawbacks of this adsorbent are its preparation requires multistage cation exchange and it is highly sensitive to small amount of moisture.

J. T. Mullhaupt et al. in U.S. Pat. No. 5,945,079 (1999) entitled "Oxygen selective sorbents", describes an invention comprises a process for air separation using oxygen selective sorbent with enhanced selectivity, loading capacities and oxygen uptake rates have a transition metal complex in solid form supported on a high surface area substrate. The drawbacks of this adsorbent are (a) The adsorption is not physical adsorption and hence it is not completely reversible, (b) The preparation and handling of the adsorbent is very difficult and (c) the use of this adsorbent is not commercially economical.

N. V. Choudray et al in No. U.S. Pat. No. 6,030,916 (2000) entitled "Process for the preparation of a molecular sieve adsorbent for selectively adsorbing nitrogen from a gaseous mixture", describes the preparation of molecular sieve adsorbents containing yttrium and alkali and/or alkaline earth metals as the extra framework exchangeable cations, useful for the separation of oxygen and/or nitrogen from air. The main drawback is the yttrium exchange process requires several cycles to obtain the adsorbent having high nitrogen selectivity.

N. V. Choudray et al in U.S. Pat. No. 6,087,289 (2000) entitled "Process for the preparation of a molecular sieve adsorbent for selectively adsorbing oxygen from a gas mixture", describes a process for the, preparation of a zeolte based adsorbent containing cerium cations are used for the selective adsorption of oxygen from a gas mixture. The main drawbacks of this adsorbent are its low oxygen capacity (around 3 cc/g at 30° C. and 1 atm) and the oxygen selectivity is only in the low-pressure region.

M. Bulow et al. in U.S. Pat. No. 6,143,057 (2000) entitled "Adsorbents and adsorptive separation process", describes the use of an adsorbent composites composed of microparticulate zeolites at least 90% of whose particles have a characteristic particle dimension not greater than about 0.6 microns and a macropore inert binder used for separating nitrogen or carbon dioxide from air. A mixture of type A zeolite, alpha zeolite, type X zeolite and type Y zeolite in which the available cation sites are occupied by a mixture of cations was used as the adsorbent for the selective adsorption. The main drawbacks of this adsorbent are its preparation involves several cycles of cation exchange process and the adsorbent is highly sensitive to moisture.

R. Jain et al. in U.S. Pat. No. 6,231,644 (2001) entitled "Air separation using monolith adsorbent bed", describes the use of monolith bed for separating a first gaseous component from a gas mixture comprising the first gaseous component and a second gaseous component comprising passing the gaseous mixture into an adsorption zone. The main drawbacks of this adsorbent are its high affinity towards moisture and its preparation requires multistage ion exchange process.

N. V. Choudary et al. in Indian patent No. 181823 (1995) entitled "A process for the preparation of a molecular sieve adsorbent useful in the oxygen enrichment of air", describes the use of a zeolite A based adsorbent containing clay binders were used to produce 85–95% pure oxygen by pressure swing adsorption. The main drawbacks of this adsorbent are the low nitrogen selectivity over oxygen (3–5 at 30° C. and 1 atm), low nitrogen capacity (around 15 cc/g at 30° C. and 1 atm), its high affinity towards moisture and its preparation requires multistage calcium exchange process.

OBJECTS OF THE INVENTION

The main object of the present invention is to provide a process for the preparation of a molecular sieve adsorbent for selectively adsorbing nitrogen and argon from a gaseous mixture with oxygen, which obviates the drawbacks as detailed above.

Another object of the present invention is to provide a nitrogen selective adsorbent based on synthetic zeolite.

Yet another object of the present invention is to provide argon selective adsorbent (compared to oxygen) based on synthetic zeolite.

Still another object of the present invention is to provide an adsorbent that can visibly refer the decay in adsorption capacity and selectivity due to moisture by its colour change.

Further object of the present invention is to provide an adsorbent with increased adsorption selectivity and capacity for nitrogen from its mixture with oxygen and/or argon.

Still another object of the present invention is to provide an adsorbent, which is selective to nitrogen and argon over oxygen and can be used commercially for the separation of air.

Yet another object of the present invention is to provide an adsorbent, which can be prepared by a single stage cation exchange process.

SUMMARY OF THE INVENTION

Accordingly, the present invention provides a "Process for the preparation of a molecular sieve adsorbent for selectively adsorbing nitrogen and argon from a gaseous mixture with oxygen", which comprises of a molecular sieve adsorbent represented by the general formula, $(Ag_2O)_x \cdot (M_{2/n}O)_y \cdot (Al_2O_3)_6 \cdot (SiO_2)_{12} \cdot wH_2O$ where the values of x varies from 4.8 to 6.0, y from 0.0 to 1.2, w being the number of moles of water and M is any metal ion having valancy n.

DETAILED DESCRIPTION OF THE INVENTION

Accordingly, the present invention provides a single stage process for the preparation of crystalline molecular sieve adsorbent by silver ion exchange, used for selectively adsorbing nitrogen and argon from a gaseous mixture containing oxygen, said process comprising the steps of:

(a) mixing Zeolite A with an aqueous solution of silver salt;

(b) refluxing the solution at 30–90° C. for 4–8 hours in dark to obtain a residue;

(c) filtering and washing the residue with water till the residue is free from silver ions; and (d) drying below 85° C. in air followed by under reduced pressure to obtain the crystalline molecular sieve adsorbent having a chemical composition $(Ag_2O)_x \cdot (M_{2/n}O)_y \cdot (Al_2O_3)_6 \cdot (SiO_2)_{12} \cdot wH_2O$ An embodiment of the present invention, wherein steps (b)–(d) can be optionally performed in the following steps:

(a) mixing Zeolite A with equal amount of silver salt solution;.

(b) heating the mixture at a temperature in the range of 500–575° C. in an inert atmosphere;

(c) washing the residue with water till the residue is free from silver ions; and (d) drying the mixture at an ambient temperature under reduced pressure to obtain the crystalline molecular sieve adsorbent.

Yet another embodiment of the present invention, wherein the value of x varies from 1.2 to 6.0 moles.

Still another embodiment of the present invention, wherein the values of y varies from 0.0 to 4.8 moles.

Yet another embodiment of the present invention, wherein w is number of moles of water.

Still another embodiment of the present invention, wherein M is a cation selected from the group consisting of sodium, calcium, potassium or lithium and most preferably sodium.

Still another embodiment of the present invention, wherein the zeolite selected is in the form of granule, powder and pellets.

Yet another embodiment of the present invention, wherein the aqueous solution of silver salt solution is selected from silver per chlorate ($AgClO_4$), silver acetate or silver nitrate ($AgNO_3$).

Further embodiment of the present invention, wherein the concentration of silver salt solution is in the range of 0.25%–15% by weight/volume of zeolite A.

Still another embodiment of the present invention, wherein the ratio of aqueous solution of silver salt with zeolite A is 1:80.

Yet another embodiment of the present invention, wherein said molecular sieve having a high nitrogen adsorption capacity upto 22.3 cc/g at 30° C. and 765 mm Hg.

Further embodiment of the present invention, wherein said molecular sieve having selectivity for nitrogen over oxygen is 5–14.6 at 30° C.;

Yet another embodiment of the present invention, wherein said molecular sieve having argon adsorption capacity upto 6.5 cc/g at 30° C. and 765 mm Hg.

Further embodiment of the present invention, wherein said molecular sieve having selectivity for argon in the range of 1.2–2.0 at 30° C.

Yet another embodiment of the present invention, wherein said molecular sieve having a low hydroxylation thereby preventing the necessity of slow heating.

Further embodiment of the present invention, wherein said molecular sieve having a high purification capacity of oxygen greater than 96%.

Yet another embodiment of the present invention, wherein 10 to 100 equivalent percentages of silver ions is loaded into zeolite in a single step using any water soluble silver salt selected from silver nitrate silver perchlorate or silver acetate.

Still another embodiment of the present invention, wherein the zeolite is. ion exchanged with 80 to 100 equivalent percent silver ions and activated molecular sieve adsorbent is orange red/brick red coloured.

Yet another embodiment of the present invention, wherein the molecular sieve adsorbent is dried at a temperature below 85° C. preferably at a temperature in the range of 20° C. to 80° C. in air or under vacuum.

The invention is further explained in the form of the following embodiments:

Zeolites, which are microporous crystalline alumna-silicates, are finding increased applications as adsorbents for separating mixtures of closely related compounds. Zeolites have a three dimensional network of basic structural units consisting $SiO_4$ and $AlO_4$ tetrahedrons linked to each other by sharing apical oxygen atoms. Silicon and aluminum atoms lie in the center of the tetrahedral. The resulting alumino-silicate structure, which is generally highly porous, possesses three-dimensional pores the access to which is through molecular sized windows. In a hydrated form, the preferred zeolites are generally represented by the following formula, $M_{2/n}O\ Al_2O_3.xSiO_2.wH_2O$ where M is a cation, which balances the electrovalence of the tetrahedral and is generally referred to as extra framework exchangeable cation, n represents the valancy of the cation and x and w represents the moles of $SiO_2$ and water respectively. The cation may be any one of the numbers of cations, which will hereinafter be described in detail.

The attributes which makes the zeolites attractive for separation include, an unusually high thermal and hydrothermal stability, uniform pore structure, easy pore aperture modification and substantial adsorption capacity even at low adsorbate pressures. Furthermore, zeolites can be produced synthetically under relatively moderate hydrothermal conditions.

X-ray powder diffraction data was collected using PHILIPS X'pert MPD system equipped with XRK 900 reaction chamber. Comparing the X-ray diffraction data with literature X-ray data checked the crystallinity of the adsorbent particles. The X-ray diffraction at "d" values 12.1925, 5.489, 4.086, 3.2818, 2.9773 and 2.7215 were used for comparison.

The zeolite NaA powder [$Na_{12}(AlO_2)_{12}.(SiO_2)_{12}.wH_2O$] was used as the starting material. X-ray diffraction data showed that the starting material was highly crystalline. The zeolite NaA was mixed with a specified concentration of aqueous silver salt solutions in the ratio 1:80 and treated at 30–90° C. for 4–8 hours in the dark. The residue was filtered, washed with hot distilled water, until the washings were free from silver ions (tested with sodium chloride solution) and dried at room temperature to 80° C. in air and also under vacuum conditions as specified in the examples. The silver exchange completes in a single step since the equilibrium of the cation exchange reaction favors the easy formation of the product. The extent of silver exchange was determined by Atomic Absorption Spectroscopy.

Oxygen, nitrogen and argon adsorption at 15° C. and 30° C. was measured using a static volumetric system (Micromeritics ASAP 2010), after activating the sample at 350° C. to 450° C. under vacuum for 4 hours as described in the Examples. Addition of the adsorbate gas was made at volumes required to achieve a targeted set of pressures ranging from 0.5 to 850 mmHg. A minimum equilibrium interval of 5 seconds with a relative target tolerance of 5.0% of the targeted pressure and an absolute target tolerance of 5.000 mmHg were used to determine equilibrium for each measurement point. The adsorption and desorption are completely reversible, hence it is possible to remove the adsorbed gases by simple evacuation.

The heat of adsorption was calculated using the following equation

Heat of adsorption, $\Delta_{ad}H^0 = R\{[\partial \ln p]/[\partial(1/T)]\}_\theta$ where R is the universal gas constant, θ is the amount of gas adsorbed at a pressure p and temperature T. A plot of lnp against 1/T should be a straight line of slope $\Delta_{ad}H^0/R$.

The selectivity of two gases A and B is given by the equation, $\Delta_{A/B} = [V_A/V_B]_{P,T}$ where $V_A$ and $V_B$ are the volumes of gas A and B adsorbed at any given pressure P and temperature T.

The important inventive steps involved in the present invention are that the molecular sieve adsorbent obtained, (i) is prepared by a single stage ion exchange process using aqueous solution of any silver salt in a temperature range of room temperature to 90° C., (ii) is stable during the activation process, hydroxylation chance is very low and hence the activation process does not require very slow heating, (iii)

has a brick red/orange red colour afer the activation, which changes with decay of the adsorption capacity and selectivity due to the presence of moisture in the feed gas mixture, (iv) has, adsorption capacity and selectivity for nitorgen is maximum reported for any zeolite A based adsorbent so far and (v) has argon selectivity over oxygen, which will be useful for the production of oxygen with purity higher than 96%.

The following examples are given by way of illustration and therefore should not be constructed to limit the scope of the present invention.

EXAMPLE-1

The zeolite NaA powder $[(Na_2O)_6.(Al_2O_3)_6.(SiO_2)_{12}.wH_2O]$ was used as the starting material. A known amount of the sample was activated at 350° C. under vacuum and adsorption measurements were carried out as described earlier. The adsorption capacity for nitrogen is only 7.5 cc/g at 30° C. and 765 mmHg and selectivity for nitrogen over oxygen is only around 3 in the pressure range studied, the values are given in table 1. The heat of adsorption values, given in table-2 and the shape of desorption curve shows that the adsorption is physisorption and completely reversible.

EXAMPLE-2

The zeolite NaA powder $[Na_{12}(AlO_2)_{12}.(SiO_2)_{12}.wH_2O]$ was used as the starting material. 10.0 g of the NaA powder was mixed with 0.1M calcium chloride solutions in the ratio 1:80 and refluxed at 80° C. for 4 hours. The solution was decanted and the residue was mixed with fresh calcium chloride and the procedure was repeated four more times to ensure the complete replacement of the sodium ions with calcium ions. The residue is filtered, washed with hot distilled water, until the washings are free from chloride (tested with silver nitrate solution) and dried in air at room temperature (30° C.). Elemental analysis shows the chemical composition of the adsorbent is $(CaO)_{5.8}.(Na_2O)_{0.2}.(Al_2O_3)_6.(SiO_2)_{12}.wH_2O$. X-ray diffraction data shows that the material is highly crystalline. A known amount of the sample was activated at 350° C. under vacuum and adsorption measurements were carried out as described earlier. The adsorption capacity for nitrogen is 15.5 cc/g at 30° C. and 765 mmHg and selectivity for nitrogen over oxygen is 3 to 5.5 in the pressure range studied, values are given in table-1. The heat of adsorption values, given in table-2 and the shape of desorption curve shows that the adsorption is physisorption and completely reversible.

EXAMPLE-3

The zeolite NaA powder $[Na_{12}(AlO_2)_{12}.(SiO_2)_{12}.wH_2O]$ was used as the starting material. 25.0 g of the molecular sieve NaA powder was mixed with 0.1M $AgNO_3$ solutions in the ratio 1:80 and refluxed at 80° C. for 4 hours. The residue is filtered, washed with hot distilled water, until the washings are free from silver ions (tested with sodium chloride solution) and dried in air at room temperature (28° C.). Elemental analysis shows the chemical composition of the adsorbent is $(Ag_2O)_{5.6}.(Na_2O)_{0.4}.(Al_2O_3)_6.(SiO_2)_{12}.wH_2O$. X-ray diffraction data shows that the material is highly crystalline. A known amount of the sample was activated at 350° C. under vacuum and adsorption measurements were carried out as described earlier. The colour of the sample became blackish brown after activating at 350° C. The adsorption capacity for nitrogen is 21.4 cc/g at 30° C. and 765 mmHg and selectivity for nitrogen over oxygen is 4.9 to 10.3 in the pressure range studied, values are given in table-1, which are very high compared to the commercially using zeolite A based adsorbent. The heat of adsorption values, given in table-2 and the shape of desorption curve shows that the adsorption is physisorption and completely reversible.

EXAMPLE-4

Figure 1:
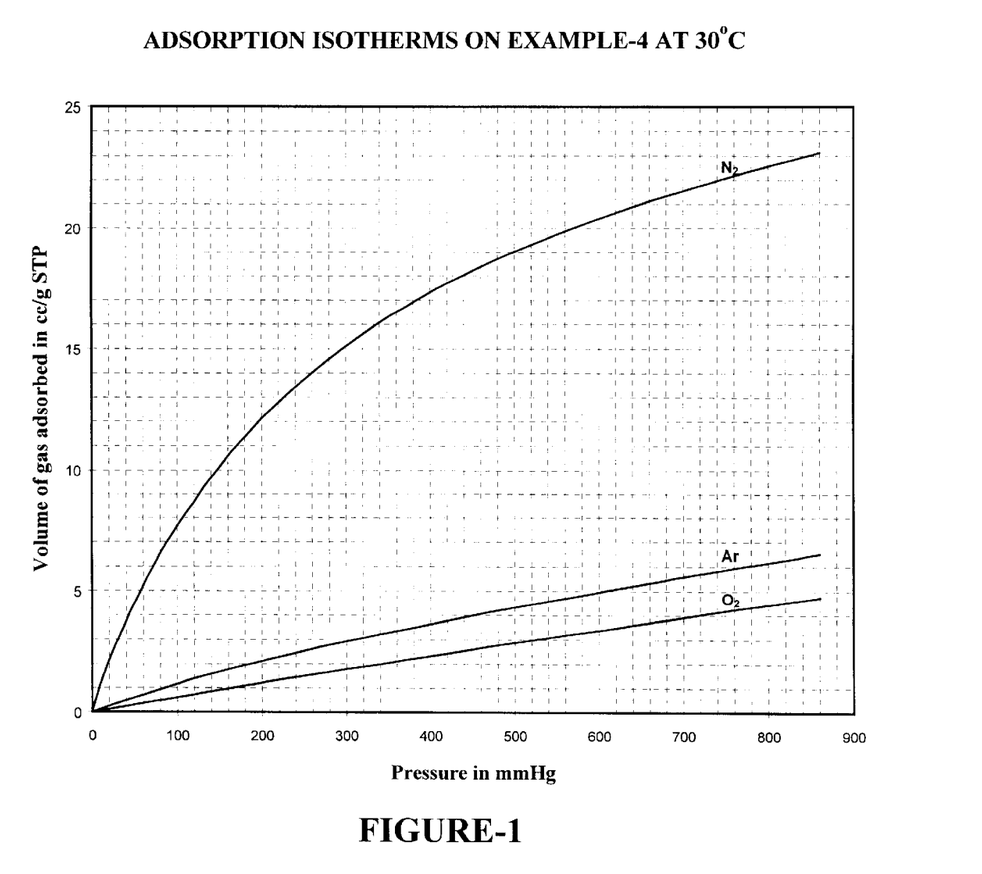
FIG. 1 represents the adsorption isotherms of nitrogen, argon and oxygen at 30° C. on the adsorbent obtained from example-4.
Figure 2:
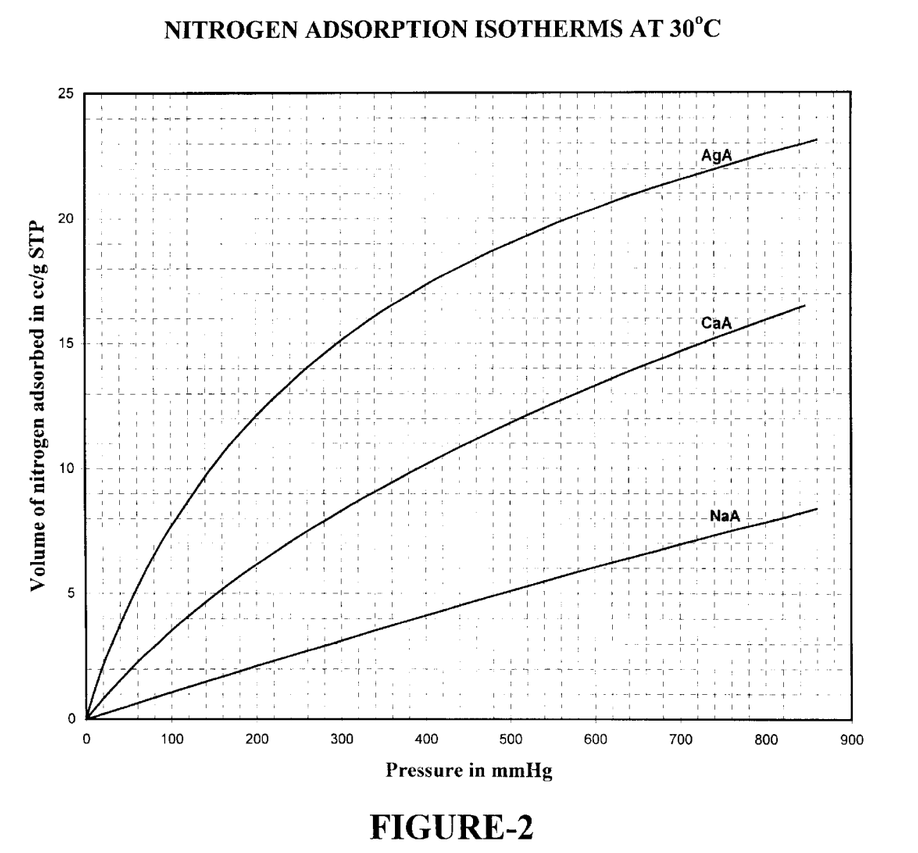
FIG. 2 represents the nitrogen adsorption isotherms on zeolites NaA, CaA and AgA at 30° C.
Figure 3:
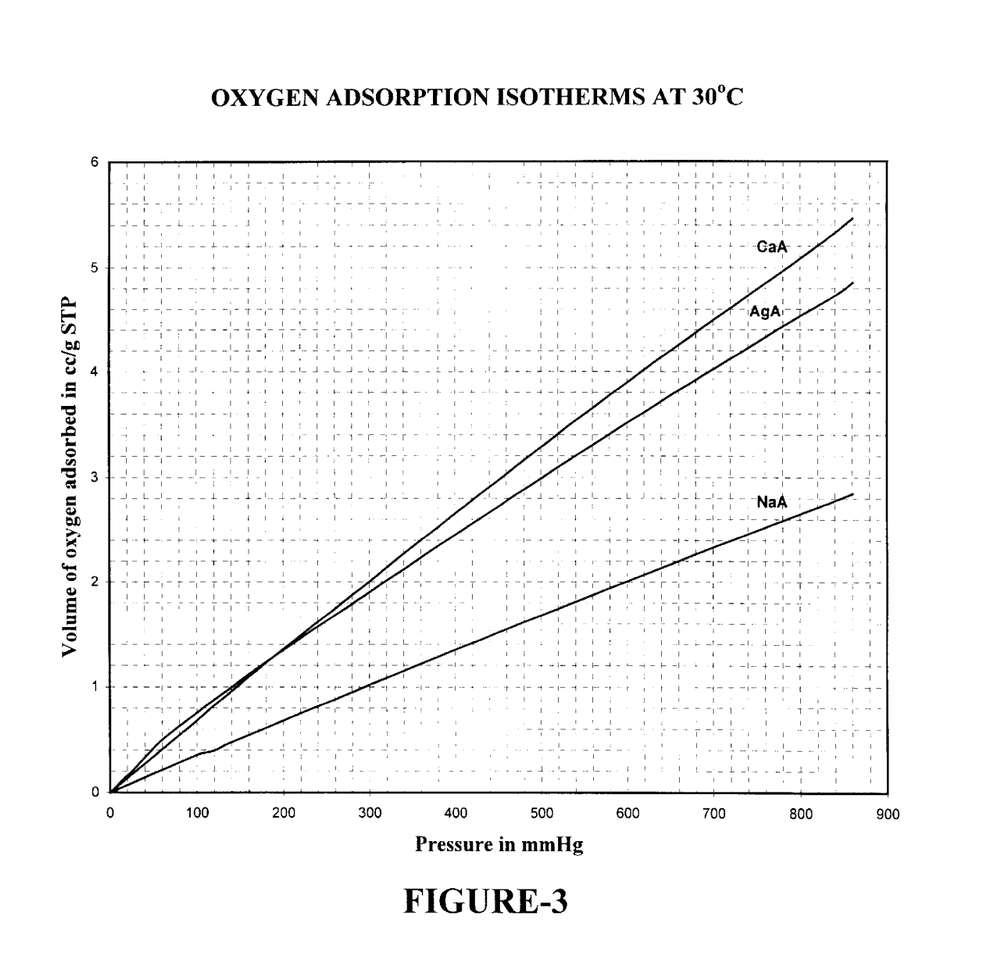
FIG. 3 represents the oxygen adsorption isotherms on zeolites NaA, AgA and CaA at 30° C.
Figure 4:
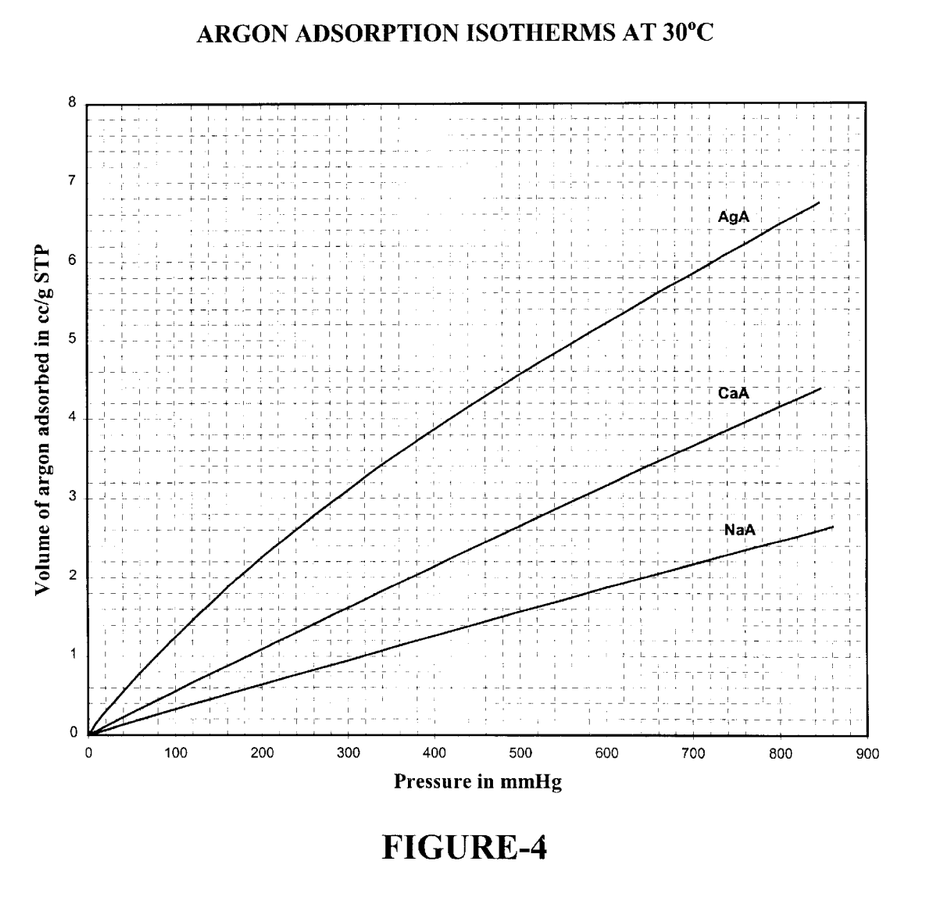
FIG. 4 represents the argon adsorption isotherms on zeolites NaA, CaA and AgA at 30° C.

The zeolite NaA powder $[Na_{12}(AlO_2)_{12}.(SiO_2)_{12}.wH_2O]$ was used as the starting material. 25.0 g of the molecular sieve NaA powder was mixed with 0.1M $AgNO_3$ solutions in the ratio 1:80 and refluxed at 80° C. for 4 hours. The residue is filtered, washed with hot distilled water, until the washings are free from silver ions (tested with sodium chloride solution) and dried in air at room temperature (30° C.). Elemental analysis shows the chemical composition of the adsorbent is $(Ag_2O)_{5.8}.(Na_2O)_{0.2}.(Al_2O_3)_6.(SiO_2)_{12}.wH_2O$. X-ray diffraction data shows that the material is highly crystalline. A known amount of the sample was activated at 380° C. under vacuum and adsorption measurements were carried out as described earlier. The colour of the sample became brick red after activating at 380° C. The adsorption isotherms are given in FIG. 1. The adsorption capacity for nitrogen is 22.3 cc/g at 30° C. and 765 mmHg and selectivity for nitrogen over oxygen is 5.2 to 14.6 in the pressure range studied, values are given in table-1, which are very high compared to the commercially using zeolite A based adsorbent. The heat of adsorption values, given in table-2 and the shape of desorption curve shows that the adsorption is physisorption and completely reversible.

EXAMPLE-5

The zeolite NaA powder $[Na_{12}(AlO_2)_{12}.(SiO_2)_{12}.wH_2O]$ was used as the starting material. 25.0 g of the molecular sieve NaA powder was mixed with 0.1M $AgNO_3$ solutions in the ratio 1:80 and refluxed at 80° C. for 4 hours. The residue is filtered, washed with hot distilled water, until the washings are free from silver ions (tested with sodium chloride solution) and dried in air oven at 60° C. Elemental analysis shows the chemical composition of the adsorbent is $(Ag_2O)_{5.4}.(Na_2O)_{0.6}.(Al_2O_3)_6.(SiO_2)_{12}.wH_2O$. X-ray diffraction data shows that the material is highly crystalline. A known amount of the sample was activated at 380° C. under vacuum and adsorption measurements were carried out as described earlier. The colour of the sample became brick red after activating at 380° C. The adsorption capacity for nitrogen is 20.7 cc/g at 30° C. and 765 mmHg and selectivity for nitrogen over oxygen is 4.7 to 12.0 in the pressure range studied, values are given in table-1, which are very high compared to the commercially using zeolite A based adsorbent. The heat of adsorption values, given in table-2 and the shape of desorption curve shows that the adsorption is physisorption and completely reversible.

EXAMPLE-6

The zeolite NaA powder [$Na_{12}(AlO_2)_{12}.(SiO_2)_{12}.wH_2O$] was used as the starting material. 10.0 g of the molecular sieve NaA powder was mixed with $AgNO_3$ solutions containing 12.0 g $AgNO_3$, in the ratio 1:80 and refluxed at 80° C. for 4 hours. The residue is filtered, washed with hot distilled water, until the washings are free from silver ions (tested with sodium chloride solution) and dried in air oven at 40° C. Elemental analysis shows the chemical composition of the adsorbent is $(Ag_2O)_{5.2}.(Na_2O)_{0.8}.(Al_2O_3)_6.(SiO_2)_{12}.wH_2O$. X-ray diffraction data shows that the material is highly crystalline. A known amount of the sample was activated at 400° C. under vacuum and adsorption measurements were carried out as described earlier. The colour of the sample became orange red after activating at 400° C. The adsorption capacity for nitrogen is 20.1 cc/g at 30° C. and 765 mmHg and selectivity for nitrogen over oxygen is 4.6 to 12.7 in the pressure range studied, values are given in table-1, which are very high compared to the commercially using zeolite A based adsorbent. The heat of adsorption values, given in table-2 and the shape of desorption curve shows that the adsorption is physisorption and completely reversible.

EXAMPLE-7

The zeolite NaA granules [$Na_{12}(AlO_2)_{12}.(SiO_2)_{12}.wH_2O$] was used as the starting material. 10.0 g of the molecular sieve NaA granules was mixed with $AgNO_3$ solutions containing 14.0 g $AgNO_3$, in the ratio 1:80 and refluxed at 80° C. for 4 hours. The residue is filtered, washed with hot distilled water, until the washings are free from silver ions (tested with sodium chloride solution) and dried in hot air oven at 80° C. Elemental analysis shows the chemical composition of the adsorbent is $(Ag_2O)_{5.7}.(Na_2O)_{0.3}.(Al_2O_3)_6.(SiO_2)_{12}.wH_2O$. X-ray diffraction data shows that the material is highly crystalline. A known amount of the sample was activated at 350° C. under vacuum and adsorption measurements were carried out as described earlier. The colour of the sample became brick red after activating at 350° C. The adsorption capacity for nitrogen is 22.1 cc/g at 30° C. and 765 mmHg and selectivity for nitrogen over oxygen is 5.3 to 14.4 in the pressure range studied, values are given in table-1, which are very high compared to the commercially using zeolite A based adsorbent. The heat of adsorption values, given in table-2 and the shape of desorption curve shows that the adsorption is physisorption and completely reversible.

EXAMPLE-8

The zeolite NaA granules [$Na_{12}(AlO_2)_{12}.(SiO_2)_{12}.wH_2O$] was used as the starting material. 10.0 g of the zeolite NaA granules was mixed with $AgClO_4$ solutions containing 18.0 g $AgClO_4$, in the ratio 1:80 and refluxed at 80° C. for 4 hours. The residue is filtered, washed with hot distilled water, until the washings are free from silver ions (tested with sodium chloride solution) and dried in hot air oven at 80° C. Elemental analysis shows the chemical composition of the adsorbent is $(Ag_2O)_{5.6}.(Na_2O)_{0.4}.(Al_2O_3)_6.(SiO_2)_{12}.wH_2O$. X-ray diffraction data shows that the material is highly crystalline. A known amount of the sample was activated at 350° C. under vacuum and adsorption measurements were carried out as described earlier. The colour of the sample became Yellow orange after activating at 350° C. The adsorption capacity for nitrogen is 22.3 cc/g at 30° C. and 765 mmHg and selectivity for nitrogen over oxygen is 5.2 to 14.2 in the pressure range studied, values are given in table-1, which are very high compared to the commercially using zeolite A based adsorbent. The heat of adsorption values, given in table-2 and the shape of desorption curve shows that the adsorption is physisorption and completely reversible.

EXAMPLE-9

The zeolite NaA granules [$Na_{12}(AlO_2)_{12}.(SiO_2)_{12}.wH_2O$] was used as the starting material. 10.0 g of the zeolite NaA granules was mixed with silver acetate solutions containing 13.0 g silver acetate, in the ratio 1:80 and refluxed at 80° C. for 4 hours. The residue is filtered, washed with hot distilled water, until the washings are free from silver ions (tested with sodium chloride solution) and dried in hot air oven at 80° C. Elemental analysis shows the chemical composition of the adsorbent is $(Ag_2O)_{5.4}.(Na_2O)_{0.6}.(Al_2O_3)_6.(SiO_2)_{12}.wH_2O$. X-ray diffraction data shows that the material is highly crystalline. A known amount of the sample was activated at 350° C. under vacuum and adsorption measurements were carried out as described earlier. The colour of the sample became Orange red after activating at 350° C. The adsorption capacity for nitrogen is 21.3 cc/g at 30° C. and 765 mmHg and selectivity for nitrogen over oxygen is 4.9 to 13.8 in the pressure range studied, values are given in table-1, which are very high compared to the commercially using zeolite A based adsorbent. The heat of adsorption values, given in table-2 and the shape of desorption curve shows that the adsorption is physisorption and completely reversible.

EXAMPLE-10

The zeolite NaA powder [$Na_{12}(AlO_2)_{12}.(SiO_2)_{12}.wH_2O$] was used as the starting material. 10.0 g of the molecular sieve NaA powder was mixed with $AgNO_3$ solutions containing 8.5 g $AgNO_3$, in the ratio 1:80 and refluxed at 80° C. for 4 hours. The residue is filtered, washed with hot distilled water, until the washings are free from silver ions (tested with sodium chloride solution) and dried in vacuum oven at 80° C. Elemental analysis shows the chemical composition of the adsorbent is $(Ag_2O)_{4.8}.(Na_2O)_{1.2}.(Al_2O_3)_6.(SiO_2)_{12}.wH_2O$. X-ray diffraction data shows that the material is highly crystalline. A known amount of the sample was activated at 350° C. under vacuum and adsorption measurements were carried out as described earlier. The colour of the sample became yellow orange after activating at 350° C. The adsorption capacity for nitrogen is 18.8 cc/g at 30° C. and 765 mmHg and selectivity for nitrogen over oxygen is 4.8 to 13.4 in the pressure range studied, values are given in table-1, which are very high compared to the commercially using zeolite A based adsorbent. The heat of adsorption values, given in table-2 and the shape of desorption curve shows that the adsorption is physisorption and completely reversible.

EXAMPLE-11

The zeolite NaA powder [$Na_{12}(AlO_2)_{12}.(SiO_2)_{12}.wH_2O$] was used as the starting material. 10.0 g of the molecular sieve NaA powder was mixed with $AgNO_3$ solutions containing 7.0 g $AgNO_3$, in the ratio 1:80 and refluxed at 80° C. for 4 hours. The residue is filtered, washed with hot distilled water, until the washings are free from silver ions (tested with sodium chloride solution) and dried in vacuum oven at 80° C. Elemental analysis shows the chemical composition of the adsorbent is $(Ag_2O)_{4.2}.(Na_2O)_{1.8}.(Al_2O_3)_6.(SiO_2)_{12}.wH_2O$. X-ray diffraction data shows that the material is highly crystalline. A known amount of the sample was activated at 350° C. under vacuum and adsorption measurements were carried out as described earlier. The colour of the sample became orange red after activating at 350° C. The adsorption capacity for nitrogen is 9.1 cc/g at 30° C. and 765 mmHg and selectivity for nitrogen over oxygen is only around 3.5 in the pressure range studied, the values are given in table-1. The heat of adsorption values, given in table-2 and the shape of desorption curve shows that the adsorption is physisorption and completely reversible.

EXAMPLE-12

The zeolite NaA powder $[Na_{12}(AlO_2)_{12}.(SiO_2)_{12}.wH_2O$ was used as the starting material. 10.0 g of the molecular sieve NaA powder was mixed with $AgNO_3$ solutions containing 6.0 g $AgNO_3$, in the ratio 1:80 and refluxed at 80° C. for 4 hours. The residue is filtered, washed with hot distilled water, until the washings are free from silver ions (tested with sodium chloride solution) and dried in vacuum oven at 80° C. Elemental analysis shows the chemical composition of the adsorbent is $(Ag_2O)_{3.6}.(Na_2O)_{2.4}.(Al_2O_3)_6.(SiO_2)_{12}.wH_2O$. X-ray diffraction data shows that the material is highly crystalline. A known amount of the sample was activated at 350° C. under vacuum and adsorption measurements were carried out as described earlier. The colour of the sample became yellow orange after activating at 350° C. The adsorption capacity for nitrogen is 8.8 cc/g at 30° C. and 765 mmHg and selectivity for nitrogen over oxygen is only around 3.1 in the pressure range studied, the values are given in table-1. The heat of adsorption values, given in table-2 and the shape of desorption curve shows that the adsorption is physisorption and completely reversible.

EXAMPLE-13

The zeolite NaA powder $[Na_{12}(AlO_2)_{12}.(SiO_2)_{12}.wH_2O]$ was used as the starting material 10.0 g of the molecular sieve NaA powder was mixed with $AgNO_3$ solutions containing 4.0 g $AgNO_3$, in the ratio 1:80 and refluxed at 80° C. for 4 hours. The residue is filtered, washed with hot distilled water, until the washings are free from silver ions (tested with sodium chloride solution) and dried in vacuum oven at 80° C. X-ray diffraction data shows that the material is highly crystalline. Elemental analysis shows the chemical composition of the adsorbent is $(Ag_2O)_{2.4}.(Na_2O)_{3.6}.(Al_2O_3)_6.(SiO_2)_{12}.wH_2O$. A known amount of the sample was activated at 350° C. under vacuum and adsorption measurements were carried out as described earlier. The colour of the sample became orange red after activating at 350° C. The adsorption capacity for nitrogen is 8.7 cc/g at 30° C. and 765 mmHg and selectivity for nitrogen over oxygen is only around 3.7 in the pressure range studied, the values are given in table-1. The heat of adsorption values, given in table-2 and the shape of desorption curve shows that the adsorption is physisorption and completely reversible.

EXAMPLE-14

The zeolite NaA powder $[Na_{12}.(AlO_2)_{12}.(SiO_2)_{12}.wH_2O]$ was used as the starting material. 10.0 g of the molecular sieve NaA powder was mixed with $AgNO_3$ solutions containing 2.0 g $AgNO_3$, in the ratio 1:80 and refluxed at 80° C. for 4 hours. The residue is filtered, washed with hot distilled water, until the washings are free from silver ions (tested with sodium chloride solution) and dried in vacuum oven at 80° C. Elemental analysis shows the chemical composition of the adsorbent is $(Ag_2O)_{1.2}.(Na_2O)_{4.8}.(Al_2O_3)_6.(SiO_2)_{12}.wH_2O$. X-ray diffraction data shows that the material is highly crystalline. A known amount of the sample was activated at 350° C. under vacuum and adsorption measurements were carried out as described earlier. The colour of the sample became brick red after activating at 350° C. The adsorption capacity for nitrogen is 5.9 cc/g at 30° C. and 765 mmHg and selectivity for nitrogen over oxygen is only around 3.4 in the pressure range studied, the values are given in table-1. The heat of adsorption values, given in table-2 and the shape of desorption curve shows that the adsorption is physisorption and completely reversible.

EXAMPLE-15

The adsorbent obtained by the method as described in Example-5 were further treated with 0.1M $AgNO_3$ solutions in the ratio 1:80 and refluxed at 80° C. for 4 hours. The residue is filtered, washed with hot distilled water, until the washings are free from silver ions (tested with sodium chloride solution) and dried in air at room temperature (28° C.). Elemental analysis shows the chemical composition of the adsorbent is $(Ag_2O)_{5.8}.(Na_2O)_{0.2}.(Al_2O_3)_6.(SiO_2)_{12}.wH_2O$. X-ray diffraciton data shows that the material is highly crystalline. A known amount of the sample was activated at 350° C. under vacuum and adsorption measurements were carried out at 15° C. and 30° C. as described above. The colour of the sample became brick red after activating at 350° C. The adsorption capacity for nitrogen is 22.1 cc/g at 30° C. and 765 mmHg and selectivity for nitrogen over oxygen is 5.1 to 14.2 in the pressure range studied, values are given in table-1, which are very high compared to the commercially using zeolite A based adsorbent. The heat of adsorption values, given in table-2 and the shape. of desorption curve shows that the adsorption is physisorption and completely reversible.

EXAMPLE-16

The zeolite NaA powder $[Na_{12}(AlO_2)_{12}.(SiO_2)_{12}.wH_2O]$ was used as the starting material. 10.0 g of the molecular sieve NaA powder was mixed with $AgNO_3$ solutions containing 12.0 g $AgNO_3$, in the ratio 1:80 and refluxed at 80° C. for 4 hours. The residue is filtered, washed with hot distilled water, until the washings are free from silver ions (tested with sodium chloride solution) and dried in hot air oven at 120° C. Elemental analysis shows the chemical composition of the adsorbent is $(Ag_2O)_{5.7}.(Na_2O)_{0.3}.(Al_2O_3)_6.(SiO_2)_{12}.wH_2O$. X-ray diffraciton data shows that the material is highly crystalline. A known amount of the sample was activated at 350° C. under vacuum and adsorption measurements were carried out as described earlier. The colour of the sample became greenish black after activating at 350° C. The adsorption capacity for nitrogen is 14.5 cc/g at 30° C. and 765 mmHg and selectivity for nitrogen over oxygen only around 4.9 in the pressure range studied, the values are given in table-1. The heat of adsorption values, given in table-2 and the shape of desorption curve shows that the adsorption is physisorption and completely reversible.

EXAMPLE-17

The zeolite NaA pellets was used as the starting material. 10.0 g of the molecular sieve NaA pellets was mixed with $AgNO_3$ solutions containing 12.0 g $AgNO_3$, in the ratio 1:80 and refluxed at 80° C. for 4 hours. The residue is filtered, washed with hot distilled water, until the washings are free from silver ions (tested with sodium chloride solution) and dried in vacuum oven at 60° C. Elemental analysis shows the chemical composition of the adsorbent is $(Ag_2O)_{5.4}.(Na_2O)_{0.6}.(Al_2O_3)_6.(SiO_2)_{12}.wH_2O$. X-ray diffraction data shows that the material is highly crystalline. A known amount of the sample was activated at 450° C. under vacuum and adsorption measurements were carried out as described earlier. The colour of the sample became brownish black after activating at 450° C. The adsorption capacity for nitrogen is 22.1 cc/g at 30° C. and 765 mmHg and selectivity for nitrogen over oxygen is 5.1 to 14.2 in the pressure range studied, values are given in table-1, which are very high compared to the commercially using zeolite A based adsorbent. The heat of adsorption values, given in table-2 and the shape of desorption curve shows that the adsorption is physisorption and completely reversible.

EXAMPLE-18

The zeolite NaA powder $[Na_{12}(AlO_2)_{12}.(SiO_2)_{12}.wH_2O]$ was used as the starting material. 5.0 g of the molecular sieve NaA powder was mixed thoroughly with 5.0 g $AgNO_3$ and heated up to 575° C. under helium in a programmable tabular furnace with a heating rate of 1° C./min and the temperature was maintained at 575° C. for 4 hours. The material is washed with hot distilled water, until the washings are free from silver ions (tested with sodium chloride solution) and dried in air at room temperature (28° C.). Elemental analysis shows the chemical composition of the adsorbent is $(Ag_2O)_{5.5}.(Na_2O)_{0.5}.(Al_2O_3)_6.(SiO_2)_{12}.wH_2O$. X-ray diffraction data shows that the material is highly crystalline. A known amount of the sample was activated at 350° C. under vacuum and adsorption measurements were carried out as described earlier. The colour of the sample became brick red after activating at 350° C. The adsorption capacity for nitrogen is 21.3 cc/g at 30° C. and 765 mmHg and selectivity for nitrogen over oxygen is 5.0 to 12.8 in the pressure range studied, values are given in table-1, which are very high compared to the commercially using zeolite A based adsorbent. The heat of adsorption values, given in table-2 and the shape of desorption curve shows that the adsorption is physisorption and completely reversible.

EXAMPLE-19

The zeolite NaA powder $[Na_{12}(AlO_2)_{12}.(SiO_2)_{12}.wH_2O]$ was used as the starting material. 25.0 g of the molecular sieve NaA powder was mixed with 0.05M $AgNO_3$ solutions in the ratio 1:80 and refluxed at 80° C. for 4 hours. Decanted and the procedure was repeated once again to ensure the complete ion exchange. The residue is filtered, washed with hot distilled water, until the washings are free from silver ions (tested with sodium chloride solution) and dried in air at room temperature (28° C.). Elemental analysis shows the chemical composition of the adsorbent is $(Ag_2O)_{5.6}.(Na_2O)_{0.4}.(Al_2O_3)_6.(SiO_2)_{12}.wH_2O$. X-ray diffraction data shows that the material is highly crystalline. A known amount of the sample was activated at 350° C. under vacuum and adsorption measurements were carried out as described earlier. The colour of the sample became brick red after activating at 350° C. The adsorption capacity for nitrogen is 21.9 cc/g at 30° C. and 765 mmHg and selectivity for nitrogen over oxygen is 5.1 to 13.1 in the pressure range studied, values are given in table-1, which are very high compared to the commercially using zeolite A based adsorbent. The heat of adsorption values, given in table-2 and the shape of desorption curve shows that the adsorption is physisorption and completely reversible.

The adsorption capacity and selectivity of all the 19 samples are enumerated in the Table-1 and the colour of the sample after activation and heat of adsorption for nitrogen, oxygen and argon are given in Table-2.

ADVANTAGES OF THE INVENTION

The adsorption capacity towards nitrogen is found to be 22.3 cc/g at 30° C. and 765 mmHg, which is the maximum reported for any zeolite A based adsorbent so far.

The adsorption selectivity towards nitrogen is found to be 5.3 to14.6 at 30° C. in pressures range studied, which is the maximum reported for any zeolite A based adsorbent so far.

The adsorbent shows argon selectivity (around 2 at 30° C.) over oxygen, which is not generally observed in the case of zeolite-based adsorbents, and will be useful for the production of oxygen with purity higher than 96%.

Selectivity of nitrogen as well as argon over oxygen, which is not generally observed in other commercial molecular sieve adsorbents.

Brick red colour of the activated form of the adsorbent, which is sensitive to moisture, is helpful to find out easily whether the adsorbent is active.

The preparation of the adsorbent is a very easy single step process compared to multistage cation exchange process commercially used.

Since the chance for the hydroxylation is very low, the activation process of the adsorbent does not require much care compared to the commercially used ones.

TABLE 1

NITROGEN, OXYGEN AND ARGON ADSORPTION CAPACITIES AND SELECTIVITY DATA FOR VARIOUS ADSORBENTS

| | Amount of gas adsorbed at 30° C. & 765 mmHg in cc/g STP | | | Selectivity | | | | | |
|---|---|---|---|---|---|---|---|---|---|
| | | | | at 50 mmHg | | | at 765 mmHg | | |
| SAMPLE | Nitrogen | Oxygen | Argon | $\alpha_{N2/O2}$ | $\alpha_{N2/Ar}$ | $\alpha_{Ar/O2}$ | $\alpha_{N2/O2}$ | $\alpha_{N2/Ar}$ | $\alpha_{Ar/O2}$ |
| EXAMPLE-1 | 7.5 | 2.5 | 2.4 | 3.0 | 3.4 | 0.90 | 3.0 | 3.2 | 0.93 |
| EXAMPLE-2 | 15.5 | 4.9 | 4.0 | 5.6 | 6.8 | 0.81 | 3.2 | 3.9 | 0.79 |
| EXAMPLE-3 | 21.4 | 4.4 | 6.3 | 10.3 | 6.4 | 1.6 | 4.9 | 3.4 | 1.4 |
| EXAMPLE-4 | 22.3 | 4.3 | 6.5 | 14.6 | 7.3 | 2.0 | 5.2 | 3.4 | 1.5 |
| EXAMPLE-5 | 20.7 | 4.4 | 5.0 | 12.0 | 10.7 | 1.1 | 4.8 | 4.1 | 1.2 |
| EXAMPLE-6 | 20.1 | 4.3 | 4.6 | 12.7 | 11.6 | 1.1 | 4.7 | 4.4 | 1.1 |
| EXAMPLE-7 | 22.1 | 4.2 | 5.0 | 14.4 | 12.9 | 1.1 | 5.3 | 4.4 | 1.2 |
| EXAMPLE-8 | 22.3 | 4.3 | 5.9 | 14.2 | 11.5 | 1.4 | 5.2 | 3.8 | 1.4 |
| EXAMPLE-9 | 21.3 | 4.3 | 5.8 | 13.8 | 11.1 | 1.4 | 4.9 | 3.7 | 1.3 |
| EXAMPLE-10 | 18.8 | 3.9 | 4.3 | 13.4 | 12.2 | 1.1 | 4.8 | 4.4 | 1.1 |
| EXAMPLE-11 | 9.1 | 2.9 | 3.1 | 3.5 | 3.3 | 1.0 | 3.2 | 2.9 | 1.1 |
| EXAMPLE-12 | 8.8 | 2.8 | 2.7 | 3.1 | 3.3 | 0.94 | 3.1 | 3.3 | 0.95 |
| EXAMPLE-13 | 8.7 | 2.7 | 2.5 | 3.6 | 3.7 | 0.97 | 3.3 | 3.5 | 0.94 |
| EXAMPLE-14 | 5.9 | 2.5 | 2.3 | 3.1 | 3.4 | 0.92 | 2.3 | 2.6 | 0.91 |

TABLE 1-continued

NITROGEN, OXYGEN AND ARGON ADSORPTION CAPACITIES AND SELECTIVITY DATA FOR VARIOUS ADSORBENTS

| SAMPLE | Amount of gas adsorbed at 30° C. & 765 mmHg in cc/g STP | | | Selectivity at 50 mmHg | | | at 765 mmHg | | |
|---|---|---|---|---|---|---|---|---|---|
| | Nitrogen | Oxygen | Argon | $\alpha_{N2/O2}$ | $\alpha_{N2/Ar}$ | $\alpha_{Ar/O2}$ | $\alpha_{N2/O2}$ | $\alpha_{N2/Ar}$ | $\alpha_{Ar/O2}$ |
| EXAMPLE-15 | 22.1 | 4.3 | 5.2 | 14.2 | 11.9 | 1.2 | 5.1 | 4.3 | 1.2 |
| EXAMPLE-16 | 14.5 | 4.8 | 6.5 | 4.9 | 3.7 | 1.3 | 3.0 | 2.2 | 1.4 |
| EXAMPLE-17 | 19.7 | 4.1 | 4.6 | 13.1 | 12.1 | 1.2 | 4.8 | 4.3 | 1.1 |
| EXAMPLE-18 | 21.3 | 4.3 | 4.9 | 12.8 | 11.0 | 1.2 | 5.0 | 4.3 | 1.2 |
| EXAMPLE-19 | 21.9 | 4.3 | 5.0 | 13.1 | 11.5 | 1.2 | 5.1 | 4.3 | 1.2 |

TABLE 2

INITIAL HEATS OF ADSORPTION FOR NITROGEN, OXYGEN AND ARGON IN VARIES ZEOLITES AND COLOUR AFTER ACTIVATION

| SAMPLE | | Heat of adsorption at 0.015 mmol/g coverage in (−) kJ mol$^{-1}$ | | |
|---|---|---|---|---|
| Sample Name | Colour after activation | $N_2$ | $O_2$ | Ar |
| EXAMPLE-1 | White | 20.3 | 17.0 | 14.1 |
| EXAMPLE-2 | White | 23.0 | 18.1 | 15.6 |
| EXAMPLE-3 | Blackish-brown | 36.1 | — | — |
| EXAMPLE-4 | Brick red | 40.0 | 18.4 | 16.8 |
| EXAMPLE-5 | Brick red | 37.4 | 18.2 | 16.8 |
| EXAMPLE-6 | Orange red | 34.7 | 16.6 | 15.4 |
| EXAMPLE-7 | Brick red | 32.4 | 16.4 | 15.6 |
| EXAMPLE-8 | Yellow orange | 33.8 | 16.7 | 16.0 |
| EXAMPLE-9 | Orange red | 34.3 | 15.8 | 16.1 |
| EXAMPLE-10 | Yellow orange | 30.8 | 15.8 | 16.1 |
| EXAMPLE-11 | Orange red | 21.1 | 15.7 | 16.4 |
| EXAMPLE-12 | Yellow orange | 20.9 | 15.4 | 15.1 |
| EXAMPLE-13 | Orange red | 19.6 | 16.4 | 15.5 |
| EXAMPLE-14 | Brick red | 19.9 | 16.1 | 15.3 |
| EXAMPLE-15 | Brick red | 35.1 | 16.2 | 15.1 |
| EXAMPLE-16 | Greenish black | 37.2 | 15.5 | 16.1 |
| EXAMPLE-17 | Brownish black | 35.2 | 16.0 | 16.2 |
| EXAMPLE-18 | Brick red | 34.4 | 15.3 | 17.1 |
| EXAMPLE-19 | Brick red | 36.8 | 16.0 | 16.0 |

What is claimed is:

1. A single stage process for the preparation of crystalline molecular sieve adsorbent by silver ion exchange, used for selectively adsorbing nitrogen and argon from a gaseous mixture containing oxygen, said process comprising the steps of:
   (a) mixing Zeolite A with an aqueous solution of silver salt;
   (b) refluxing the solution at 30–90° C. for 4–8 hours in dark to obtain a residue;
   (c) filtering and washing the residue with water till the residue is free from silver ions; and
   (d) drying below 85° C. in air followed by under reduced pressure to obtain the crystalline molecular sieve adsorbent having a chemical composition $(Ag_2O)_x.(M_{2/n}O)_y.(Al_2O_3)_6.(SiO_2)_{12}.wH_2O$.

2. A process according to claim 1 wherein steps (b)–(d) can be optionally performed in the following steps:
   (a) mixing Zeolite A with equal amount of silver salt solution;
   (b) heating the mixture at a temperature in the range of 500–575° C. in an inert atmosphere;
   (c) washing the residue with water till the residue is free from silver ions; and
   (d) drying the mixture at an ambient temperature under reduced pressure to obtain the crystalline molecular sieve adsorbent.

3. A process according to claim 1 wherein the value of x varies from 1.2 to 6.0 moles.

4. A process according to claim 1 wherein the values of y varies from 0.0 to 4.8 moles.

5. A process according to claim 1 wherein M is a cation selected from the group consisting of sodium, calcium, potassium or lithium.

6. A process according to claim 1 wherein the zeolite is in the form of granule, powder or pellets.

7. A process according to claim 1 wherein the aqueous solution of silver salt solution is selected from silver per chlorate ($AgClO_4$), silver acetate or silver nitrate ($AgNO_3$).

8. A process according to claim 1 wherein the concentration of silver salt solution is in the range of 0.25%–15% by weight/volume of zeolite A.

9. A process according to claim 1 wherein the ratio of aqueous solution of silver salt with zeolite A is 1:80.

10. A process according to claim 1 wherein said molecular sieve has a high nitrogen adsorption capacity upto 22.3 cc/g at 30° C. and 765 mm Hg.

11. A process according to claim 1 wherein said molecular sieve has a high nitrogen adsorption capacity up to 22.3 cc/g at 30° C. and 765 mm Hg.

12. A process according to claim 1 wherein said molecular sieve has a selectivity for nitrogen over oxygen of 5–14.6 at 30° C.

13. A process according to claim 1 wherein said molecular sieve has an argon adsorption capacity up to 6.5 cc/g at 30° C. and 765 mm Hg.

14. A process according to claim 1 wherein said molecular sieve has selectivity for argon in the range of 1.2–2.0 at 30° C.

15. A process according to claim 1 wherein said molecular sieve has a low hydroxylation thereby preventing the necessity of slow heating.

16. A process according to claim 1 wherein said molecular sieve has a high purification capacity of oxygen greater than 96%.

17. A process according to claim 1 wherein 10 to 100 equivalent percentages of silver ions is loaded into zeolite in a single step using a water soluble silver salt selected from silver nitrate perchlorate and silver acetate.

18. A process according to claim 1 wherein the molecular sieve adaorbent is dried at a temperature in the range of 20° C. to 80° C.

* * * * *